United States Patent
Clifton et al.

(10) Patent No.: US 7,329,854 B2
(45) Date of Patent: Feb. 12, 2008

(54) SYSTEM AND METHOD OF CONNECTING MULTIPLE SAFETY LIGHT CURTAINS

(75) Inventors: Frank L. Clifton, Tonka Bay, MN (US); Dean C. Erickson, Lino Lakes, MN (US); Gregory B. Ingersoll, Lauderdale, MN (US)

(73) Assignee: Banner Engineering Corporation, Minneapolis, MN (US)

( * ) Notice: Subject to any disclaimer, the term of this patent is extended or adjusted under 35 U.S.C. 154(b) by 68 days.

(21) Appl. No.: 11/236,003

(22) Filed: Sep. 26, 2005

(65) Prior Publication Data

US 2007/0069114 A1    Mar. 29, 2007

(51) Int. Cl.
*G06M 7/00* (2006.01)

(52) U.S. Cl. .................................... 250/221

(58) Field of Classification Search ............... 250/221, 250/222.1; 340/555–557
See application file for complete search history.

(56) References Cited

U.S. PATENT DOCUMENTS

| | | | |
|---|---|---|---|
| 3,704,396 A * | 11/1972 | Macdonald | ............... 361/175 |
| 5,198,661 A | 3/1993 | Anderson et al. | |
| 5,880,954 A | 3/1999 | Thomson et al. | |
| 6,201,997 B1 | 3/2001 | Giers | |
| 6,593,755 B1 | 7/2003 | Rosengren | |
| 6,778,079 B2 | 8/2004 | Weber | |
| 6,856,862 B1 * | 2/2005 | Feltner | ....................... 700/245 |
| 2003/0020616 A1 * | 1/2003 | Dodds | ....................... 340/600 |
| 2003/0141975 A1 * | 7/2003 | Hama et al. | ................. 340/556 |
| 2004/0159778 A1 * | 8/2004 | Sakaguchi | .................. 250/221 |
| 2006/0231746 A1 * | 10/2006 | Caulier | ....................... 250/221 |

OTHER PUBLICATIONS

EZ-Screen System Instruction Manual, *Banner Engineering*, Oct. 2004, pp. 1-64.
Dual Mini-Screen Dual Safety Light Screen System Instruction Manual, *Banner Engineering* pp. 2-63.
Multi-Screen System Dual Safety Light Screen System Instruction Manual, *Banner Engineering* pp. 2-67.

* cited by examiner

*Primary Examiner*—John R. Lee
(74) *Attorney, Agent, or Firm*—Merchant & Gould P.C.

(57) ABSTRACT

A light screen safety curtain system including multiple light screens cascaded together to cooperatively protect an area or machine against unwanted intrusion. Such a system includes a plurality of independently operating light screens electrically connected to each other and to a control unit. When any one light screen detects an unwanted intrusion through a guarded opening, a stop or warning signal is generated by that light screen and is transmitted to the control unit. A method of configuring a light screen safety system without the need for an external programming device is provided.

24 Claims, 6 Drawing Sheets

PRIOR ART

SYSTEM AND METHOD OF CONNECTING MULTIPLE SAFETY LIGHT CURTAINS

TECHNICAL FIELD

The present invention relates generally to safety light curtains and more specifically to a system and method of connecting multiple safety light curtains into a common control circuit.

BACKGROUND

Conventional safety light curtains have been used to guard avenues of access to machines or processes requiring limited access. This limited access may be for the purpose of industrial safety or for preventing contamination of materials or devices being used, as well as for other reasons. By way of example, an industrial hydraulic press or stamping machine might include one or more safety light curtains to prevent the machine from operating when any object is within a specified distance of the machine. Some such machines may have multiple points of access and it is desirable to provide an integrated system to protect all of these points of access.

Conventional safety light curtains are often connected together to provide an integrated protection system, but these configurations often suffer from increased response time as more curtains or larger curtains with more individual optical elements are chained together. This is due to the fact that conventional safety light curtain systems are configured to uniquely address each optical element within each light curtain individually and sequentially. It is desirable to improve these known safety light curtains so that multiple safety light curtains may be connected together without adversely impacting the response time.

When connecting together multiple safety light curtains, conventional units may require different units for use as a starting or master unit, a middle unit or an end or terminal unit with an installation of multiple units. Installation, configuration and maintenance of conventional units may also require the use of an external programming device such as a personal computer. It is desirable that safety light curtains include improved configuration tools and greater flexibility of use.

SUMMARY

The present application relates generally to a light screen safety curtain system including multiple light screens cascaded together to cooperatively protect an area or machine against unwanted intrusion. Such a system includes a plurality of independently operating light screens electrically connected to each other and to a control unit. When any one light screen detects an unwanted intrusion through a guarded opening, a warning signal, such as a stop signal, is generated by that light screen and is transmitted to the control unit.

The present invention further relates to a method of configuring a light screen safety system without the need for an external programming device.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows.

DETAILED DESCRIPTION OF THE PREFERRED EMBODIMENT

Reference will now be made in detail to exemplary aspects of the present invention which are illustrated in the accompanying drawings. Wherever possible, the same reference numbers will be used throughout the drawings to refer to the same or similar parts.

For the purpose of this Specification, the term "response time" is defined to mean the theoretical maximum amount of time that it might take for a safety light curtain to detect an intrusion through a guarded space and generate a stop signal. The control unit may then initiate an action upon receipt of the signal from the safety light curtain, such as shutting down operation of a machine guarded by the safety light curtain.

Also for the purpose of this Specification, the terms "warning signal", "signal", "stop signal" and variations thereof, mean the signal generated by the light screen and transmitted to the control unit. In many situations, the signal is a "stop signal", telling the machine to completely shut down, or stop. Throughout this Specification, the term "stop signal" is used interchangeably with "warning signal" and "signal", at least because in many situations, the signal is used to warn of encroachment through the safety light curtain, and may be used to stop the machine.

Safety light curtains may be used as a protective shield against intrusion of animate or inanimate objects into the field of operation of a machine; an example of such a machine could be a punch press or a metal shear. In operation, it is desirable that the machine not be allowed to operate or cycle while a person or object is in an area where it may be struck by the machine. Some industrial machines may have multiple points of access that need to be guarded. In such a situation, it may be conventionally desirable to have a single machine control unit responsible for stopping operation of the machine when an intrusion is detected at any of the points of access.

Figure 1:
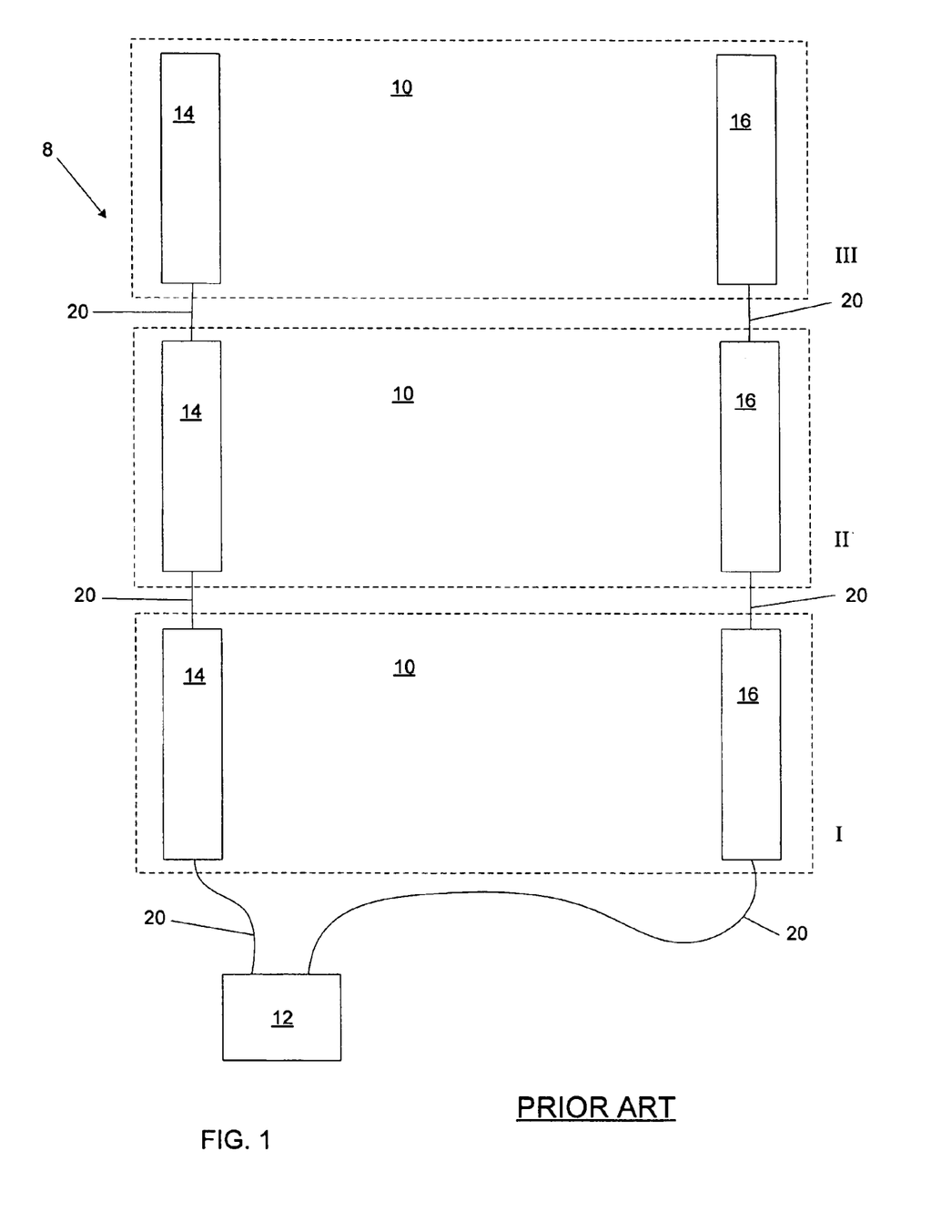
FIG. 1 is a schematic diagram of a conventional prior art safety light curtain system.

As shown in FIG. 1, a prior art system 8 may include a plurality of safety light curtains or light screens 10, which may be linked to a single machine control unit 12, which may in turn control the function of a machine (not shown). Light screens 10 are linked in series to each other and to control unit 12 by cables 20 and may be guarding three distinct points of access to the protected machine. Each light screen 10 may include a receiver 14 and an emitter 16. A conventional light screen, such as any of screens 10, may provide an array, such as a linear array, including a plurality of light transmitters, such as LEDs, housed within emitter 16 and a similarly shaped array including a plurality of light detectors, such as photocells, housed within receiver 14.

Typically, light transmitters (or emitters) and light detectors (or receivers) would generally be paired, so that there are the same numbers of transmitters as detectors. Within each light screen 10, each transmitter/detector pair is queried separately and sequentially to determine if an object is present between emitter 16 and receiver 14, preventing light from reaching the receiver 14. If such a blocked condition is detected, light screen 10 generates a signal for control unit 12. Control unit 12 may then stop the machine until the blocked condition is checked and cleared. Conventional system 8 includes a plurality of light screens 10. In operation, each transmitter/detector pair of light screen 10 I may be cycled through sequentially, after which each transmitter/detector pair of light screen 10 II may be cycled through sequentially, and finally each transmitter/detector pair of light screen 10 III may be cycled through sequentially. The query cycle would begin again with the pairs of transmitters/detectors of light screen 10 I.

Each light screen 10 has a particular response time based on the number of transmitter/detector pairs and the speed at which the light screen is able to cycle through each of the pairs. Such a response time may be in the range of from about ten to sixty milliseconds. This means that the theoretical maximum time for light screen 10 to detect an intrusion which blocks one or more of the pairs of transmitters/detectors is between ten and sixty milliseconds. By cycling through each pair of transmitters/detectors of each light screen 10 sequentially, the response time of system 8 is approximately the aggregate of the response times of each light screen. Thus, if each light screen had a response time of forty milliseconds, the response time of system 8 would be one hundred twenty milliseconds.

Figure 2:
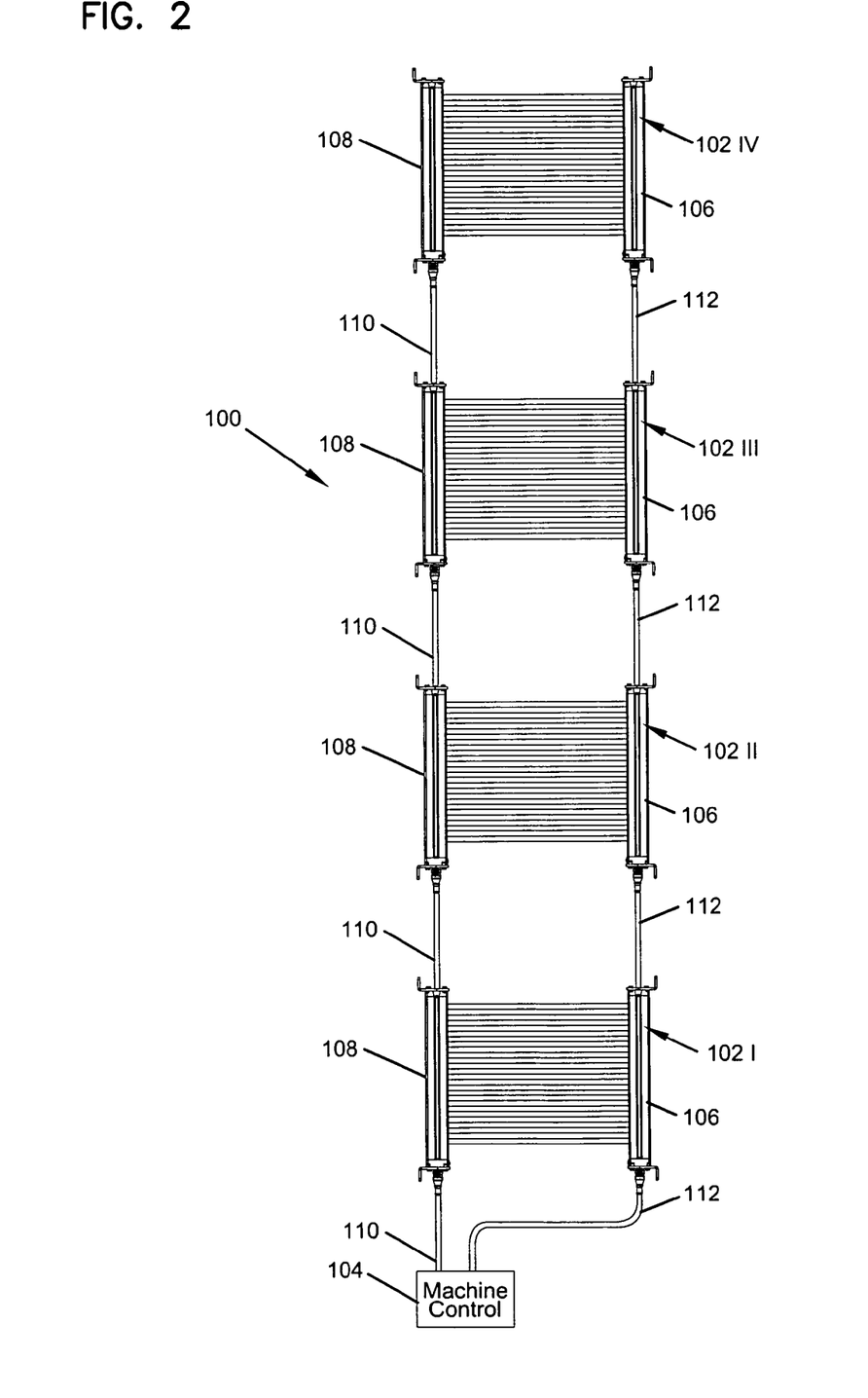
FIG. 2 is a schematic diagram of a first embodiment of a safety light curtain system according to the present invention.
Figure 3:
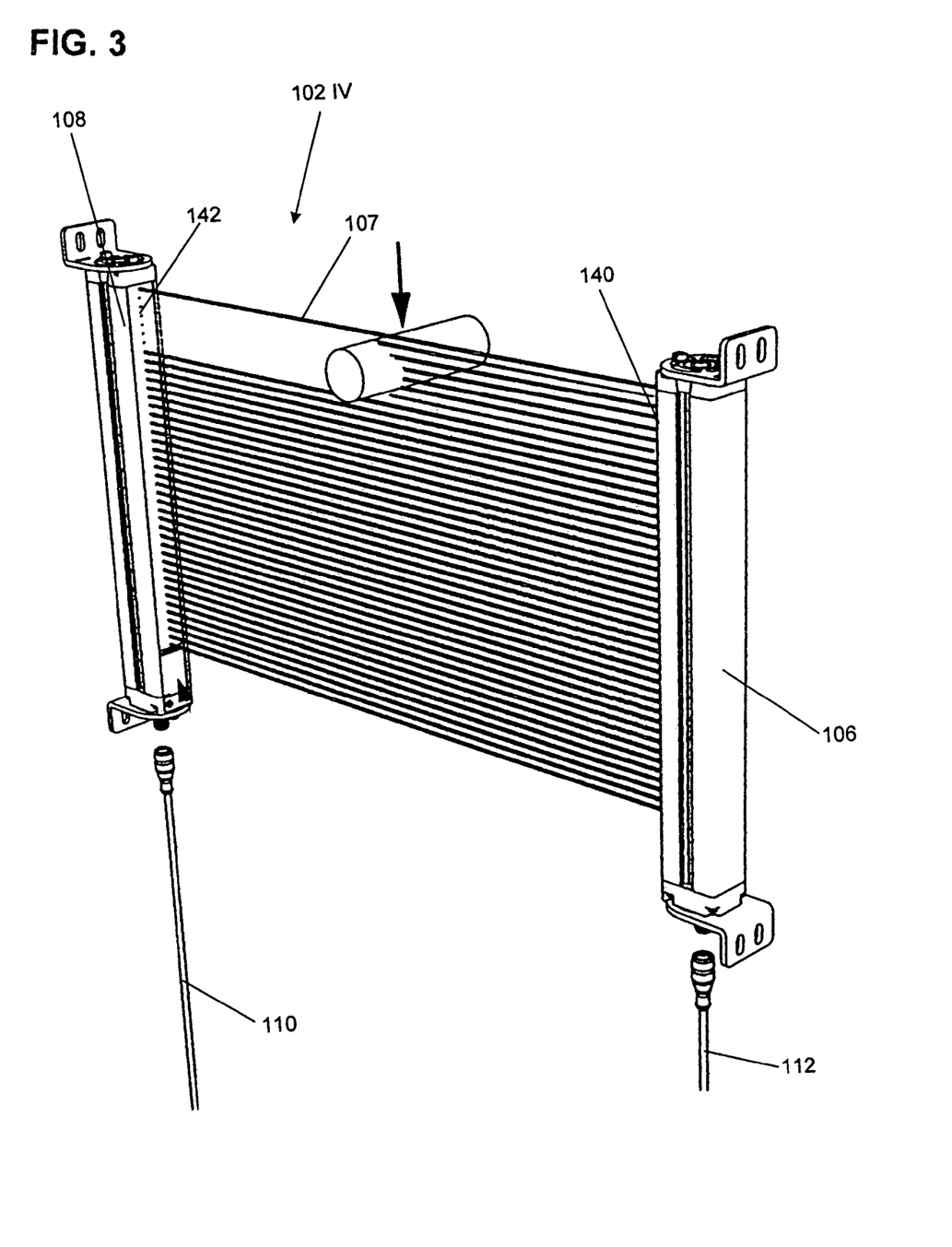
FIG. 3 is a perspective view of a single terminal safety light curtain according to the present invention for use with the system of FIG. 2, with an object blocking several of the light beams.

Referring now to FIGS. 2 and 3, a safety light curtain system 100, an embodiment according to the present disclosure, includes a plurality of light screens 102, connected in turn to a machine control unit 104. Each light screen 102 includes an emitter 106 and a receiver 108. Receivers 108 are linked by a cable 110 to adjacent light screens 102 and to control unit 104. Emitters 106 are linked by a power supply cable 112 to adjacent light screens 102 and to control unit 104. Alternatively, a separate power supply arrangement could be used specifically for emitters 106. Each light screen 102 may include a plurality of beams 107 which are defined between pairs of light transmitters 140 housed in emitter 106 and light detectors 142 housed in receiver 108. Within each light screen 102, each of the pairs of transmitters/detectors is queried sequentially, so that each light screen has a response time which is determined similarly to that of light screens 10, described above.

Each of the light screens 102 of system 100 may detect a blocked condition of one or more pairs of transmitters/detectors and initiate a signal to control unit 104, which may respond by stopping operation of the protected device or function. However, preferably each light screen 102 of system 100 operates as a distinct entity, so that querying through the transmitter/detector pairs of any one light screen 102 does not affect, limit, or delay the querying of the transmitter/detector pairs of the other light screens 102. When any light screen 102 detects a blocked condition, which should, by definition, be within the response time of that light screen, the stop signal initiated by that light screen is transmitted downstream over cable 110 toward control unit 104. The stop signal will go to the next adjacent downstream device, which may be another light screen 102 or control unit 104. An adjacent downstream light screen 102 would immediately recognize the stop signal from an upstream device and process and transmit downstream the stop signal, without regard to the status of querying of pairs of transmitters/detectors within that device. Each light screen 102 includes circuitry that permits the stop signal from an upstream light screen to be processed and transmitted downstream. The transmit time for the stop signal to cross a downstream light screen 102 is much less than the response time of that light screen 102. It is contemplated that a transmit time of approximately two milliseconds may be required to pass through the stop signal from an upstream light screen 102.

The aggregate response time of system 100 could be calculated based on the response time of the furthest upstream light screen 102 and the number of downstream light screens 102 that the signal must pass through to reach control unit 104. In this example, if upstream light screen 102 IV (see FIG. 2) has a response time of forty milliseconds, the aggregate response time of system 100 would be forty-six milliseconds. This response time is considerably less than that of system 8, described above, assuming that each system included individual light screens with similar individual response times.

A formula for calculating the response time, in milliseconds, for system 100 (having a transmit time of 2 milliseconds) with regard to the furthest light screen 102 IV would be:

$$(r+2(n-1))$$

where r is the response time in milliseconds of the light screen 102 IV and n is the total number of light screens 102 in system 100. It is possible that the response time of one of the intermediate light screens 102 may be greater than that of the furthest downstream, or terminal light screen 102 IV. If one of the intermediate light screens 102 has a greater number of pairs of transmitters/detectors, the response time of the individual light screen 102 may be sufficiently greater than that of the individual light screen 102 IV, to overcome the advantage of having fewer downstream devices to pass through. The response times of each individual light screen 102 could be calculated and the greatest value may be used as the maximum response time of system 100.

Figure 4:
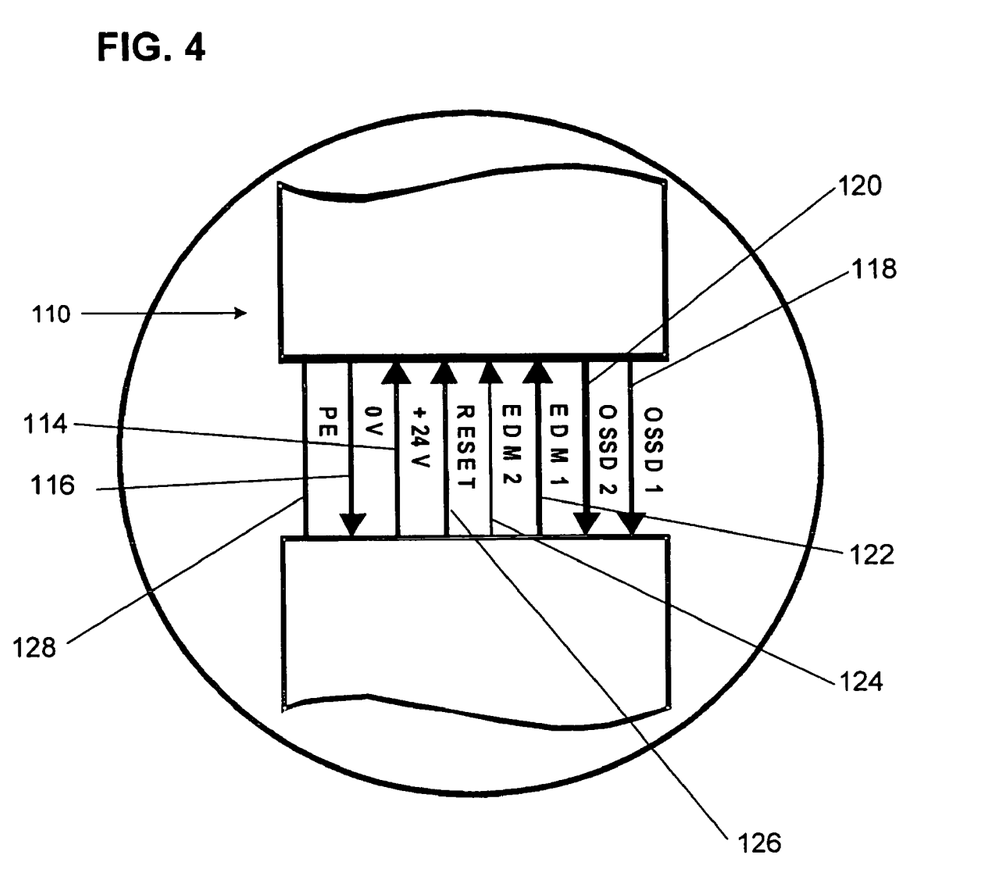
FIG. 4 is a diagrammatic view of signals being transmitted between adjacent safety light curtains of the system of FIG. 2.

FIG. 4 shows a diagrammatic view of electrical connections between adjacent light screens 102 within cable 110. In this example, eight wires are used within cable 110 to connect each light screen 102 to adjacent light screens 102 or to control unit 104. Within these eight wires there is one wire 114 designated to carry power to and another wire 116 designated to provide a return for the power circuit. In addition there is a pair of OSSD (Output Signal Switching Device) wires 118 and 120, and a pair of EDM (External Device Monitoring) wires 122 and 124. OSSD wires 118 and 120 are configured to transmit a stop signal downstream to the next adjacent device. EDM wires 122 and 124 are configured to transmit signals upstream to the next adjacent device, the signals having the status of downstream devices within system 100. OSSD wires may transmit signals toward control unit 104 when a light screen 102 has determined a stop condition exists (such as a blocked light signal between an emitter and a receiver). EDM wires may transmit signals upstream toward terminal light screen 102 IV of the overall status of system 100.

In addition, a wire 126 may be used to transmit a reset signal upstream between light screens 102 and a wire 128 may provide a ground between the devices connected by cable 110. The reset signal may be transmitted to each light screen 102 to initiate the query process of each light screen during normal operation of the protected machine, or may be used to reset each light screen 102 to an operational condition following a safety shutdown of the protected machine.

Figure 5:
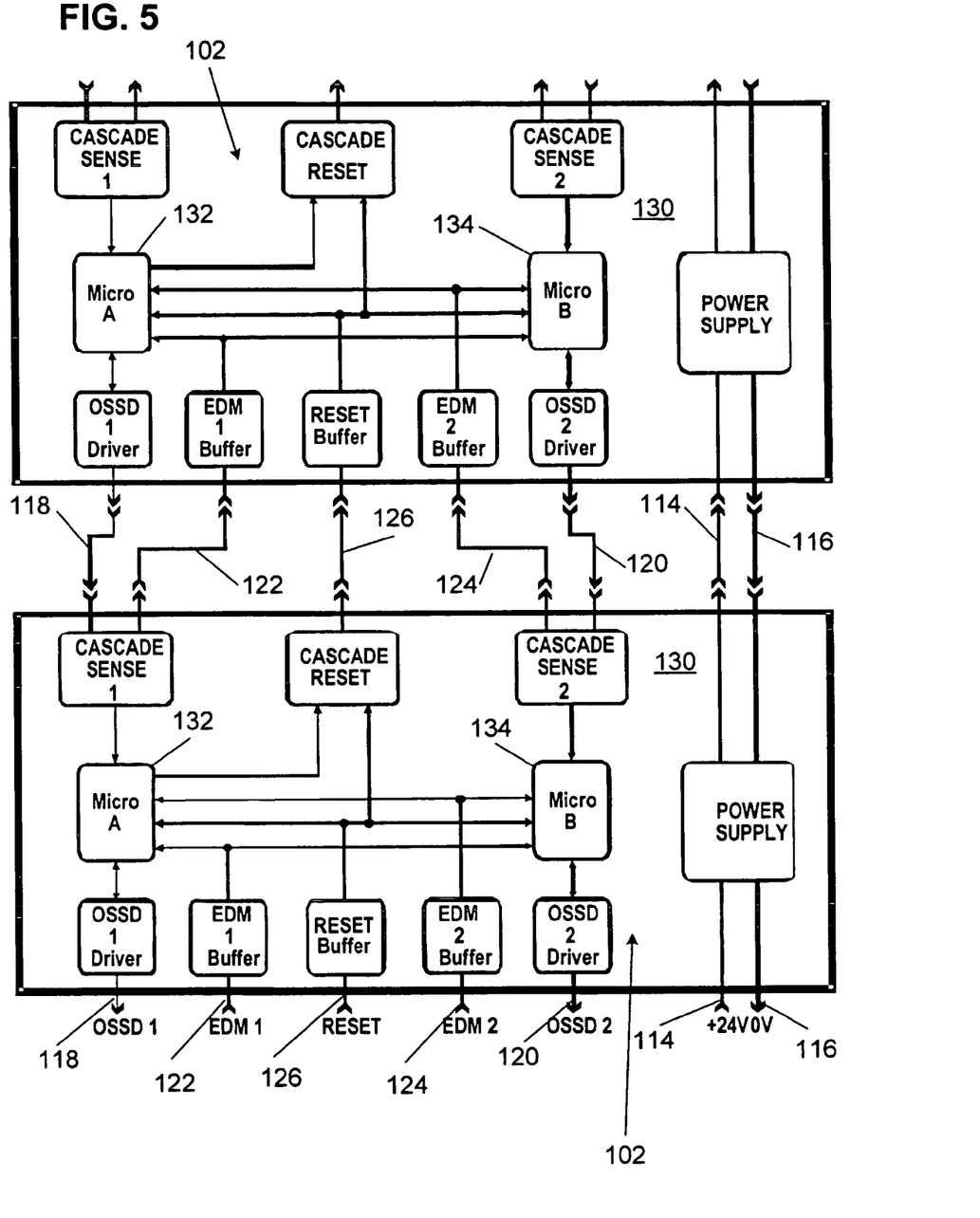
FIG. 5 is a diagrammatic view of a cascade controller within each safety light curtain of FIG. 2.

Within each light screen 102, circuitry 130 such as that shown schematically in FIG. 5 can be used to receive and transmit signals over cable 110. Circuitry 130, as shown, includes two microprocessors 132 and 134. Having two essentially duplicate data transmission and processing routes through circuitry 130 provides security in case one of the routes fails to function. Microprocessors 132 and 134 also drive the querying of the receivers within the corresponding light screen. Circuitry 130 may also receive power from cable 110, some of which is tapped to power the corresponding light screen 102 and the remainder of which may be passed through to power upstream devices.

In operation, terminal light screen 102 IV may provide a stop signal via one or both of the OSSD wires 118 or 120 of cable 110 to light screen 102 III. This stop signal is received by at least one of the microprocessors of light screen 102 III and is immediately transmitted to light screen 102 II via cable 110. Light screen 102 II may not distinguish the origin of the stop signal (whether it originated from light screen 102 IV or III) but directly transmits it through to a master light screen 102 I. Master light screen 102 I transmits the stop signal to control unit 104, which may in turn halt operation of the protected machine. Any of the light screens 102 may generate a stop signal and transmit the signal downstream toward control unit 104.

The stop signal transmitted downstream may include some feature (data or timing characteristic), which distinguishes which of the light screens 102 generated the original stop signal. However, this feature is not required for operation of the cascading light screen safety system illustrated as system 100.

The receiver of light screen 102 IV may include a physical termination connector in place of a second cable 110. Such a termination connector would provide a return to any signals transmitted upstream through the corresponding circuitry 130 indicating that light screen 102 IV is the last upstream device in system 100. Alternatively, circuitry 130 may include switches which may be set to indicate that light screen 102 IV is the final upstream device. Such switches may be hardware switches, requiring manual configuration. If a light screen 102, such as 102 IV, does not detect any OSSD signals coming in, this light screen may automatically configure itself to act as the terminal light screen, if software switches are used. Other termination mechanisms are also suitable.

It is contemplated that each of light screens 102 may be functionally identical, and that the distinction in operation of each light screen 102 is determined purely by its relative position within system 100. Alternatively, a dedicated terminal light screen 102 IV may be permanently configured as an end device, with no additional switching within circuitry 130 necessary. Similarly, a dedicated master light screen 102 I may be permanently configured to operate the configuration and other operational functions, which will be described below.

To configure the light screens 102 to operate as described above, the following process may be used. First, the various light screens 102 are connected by cables 110 as shown in FIG. 2, and also by cable 110 to control unit 104. In this embodiment, light screen 102 I is the master light screen and light screen 102 IV is the terminal light screen. Light screen 102 I may be placed into a programming or configuration mode to begin polling the upstream light screens, preferably by a polling signal sent via reset wire 126 of cables 110. As the next upstream light screen 102 II receives the polling signal from master light screen 102 I, circuitry 130 of the light screen passes the polling signal to the next upstream light screen 102 III. Each successive light screen 102 receiving the signal passes the signal upstream until the terminal light screen 102 IV is signaled and the polling signal is halted.

Upon receipt of the polling signal, each light screen 102 generates a return signal via one or both of the OSSD wires 118 and 120 that is passed through any downstream devices, as described above, until it is received by master light screen 102 I. As each light screen generates the return signal, the light screen places itself in a programming mode. By the number of return signals received and the timing of the receipt of each return signal, circuitry 130 of master light screen 102 I determines how many upstream light screens there are and in what order the light screens are arranged. While in the programming mode, each light screen upstream of master light screen 102 I also monitors the return signals sent via the OSSD wires to determine its relative position within system 100. Thus, each light screen 102 may gather information regarding how many upstream devices there are beyond it.

Each light screen 102 includes some non-volatile memory for persistent storage of configuration information determined during the programming mode. Thus, each light screen may retain information regarding its position in system 100 when system 100 is powered off or when system 100 shuts down the protected machine due to a warning or stop signal being generated by one of the light screens. This information may be retained in persistent memory on-board one or both of the processors 132 and 134, or in a separate memory device included within circuitry 130.

Figure 6:
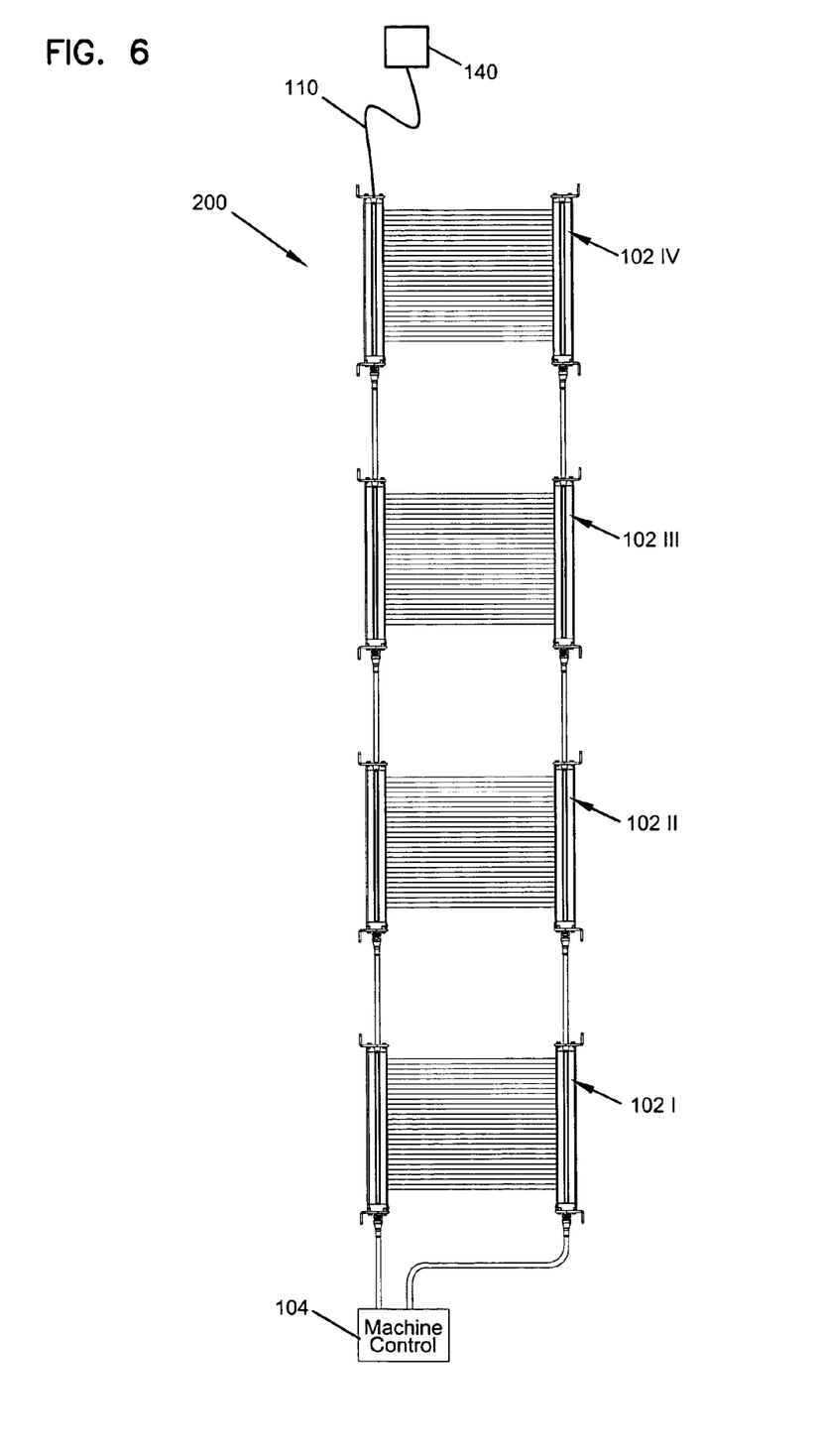
FIG. 6 is a schematic diagram of a second, alternative embodiment of a safety light curtain system according to the present invention.

It is contemplated that a non-light screen device, such as an emergency shut off switch 140 (shown in FIG. 6) may be used as the upstream-most device to terminate an alternative system 200. Switch 140 is connected to light screen 102 IV by a cable 110. In this case, light screen 102 IV is the last upstream light screen but is not the terminal device in system 200. During the programming mode, light screen 102 IV may send the polling signal upstream via reset wire 126 toward switch 140, and by the nature of the OSSD signals received, determine the type of switch. The configuration information stored within each light screen 102 of system 200 may also include information of the nature or type of devices placed upstream of the light screen. For example, light screen 102 IV may record that there is a switch upstream which terminates system 200 and the switch contacts are open. In either system 100 or 200, each light screen 102 may record the type of device(s) upstream from the light screen. This may include information of the number of transmitter/detector pairs within the upstream light screens or that there is an upstream device which is not a light screen. For example, light screen 102 II of either system 100 or 200 may record that there are two upstream light screens 102 III and IV and that each light screen includes sixty pairs of transmitters and detectors.

It is contemplated that the configuration or programming process described above may be separated into two distinct phases. In the first or key phase, master light screen 102 I of a system 100 or 200 may send out a pre-defined series of pulses on reset wires 126 to each of the upstream devices. Upon receipt of these pulses, each upstream device goes into a programming mode in preparation for the next series of pulses or signals from master light screen 102 I. In the second or query phase, master light screen 102 I initiates a second series of pulses on reset wires 126, which each of the upstream light screens 102 responds to with pulses or signals over one or both of the OSSD wires. The responses from the different upstream devices are then used by master light screen 102 I to determine how many upstream devices are in the system, the nature of the devices, and the order in which those devices are arranged. By monitoring the signals sent over the OSSD wire, each light screen 102 II, III, and IV also gets and stores information regarding its own position in system 200 and any devices which are upstream.

The query phase may contain a specified number of pulses to ensure that all devices in the system have sufficient time to respond and be recognized by the other devices, as appropriate. Upon receipt of and in response to the specified number of pulses, each device may then be placed into an operational mode, permitting the protected machine to operate. If the programming process is initiated by the sending and receipt of the pulses of the key phase, and any device in the system fails to receive the specified number of signals in the query phase, that device may enter a lockout mode, preventing the system from being placed into an operational mode.

When system 100 or 200 is powered back on after being shut down or placed back into an operational mode after responding to a stop signal from one of the cascaded devices, the system may engage in a verification process before allowing the protected machine to operate. Such a verification process may be similar to the programming process described above, except that instead of recording the derived relative location information, each light screen 102 would compare the derived configuration information with the prior configuration information held in memory. If the configuration determined during the verification process does not match the stored configuration, the system may go into a lockout mode and prevent the protected machine from operating.

The two-phase approach described above may also be used to perform the verification process. Having a set number of signals to be sent to initiate the key phase of the verification process and a set number of signals that must be received and responded to during the query phase of the process, permits that verification process to not only determine if all configured devices are present, but also to determine that all are functioning properly. If there is a failure during either the key phase or the query phase, or if there is an indication that the configuration has been changed, then the system may go into a lockout mode until the changes or failure in operation of the devices have been addressed.

Once the configuration has been determined or verified, system 100 or 200 may be placed into an operational detection mode and the protected machine may be allowed to operate. Any attempt to change the number or type of light screens or other devices within either system 100 or 200 during operation would result in the signals transmitted via the cables 110 to become non-terminated in some fashion. The non-termination may result when terminal light screen 102 IV is removed to attempt to replace it with a different light screen or other device, or when one of the intermediate light screens 102 II or III is disconnected to insert an additional device or a replacement device within the system. Any change in the termination of cables 110 caused by an attempted change to system 100 or 200 during operation should generate a shut down condition by control unit 104 and prevent operation of the protected machine.

To replace or repair any device within system 100 or 200, the programming or configuration procedure would need to be repeated, permitting the included devices 102 to determine the new or altered device locations and characteristics. These new configuration settings could then be stored by each device within system 100 or 200 and the system could be returned to normal operation. This ensures that a failure of a device in one of the systems may result in a shut down condition for the protected machine. By whatever means repair or replacement of the failed device is accomplished, the system can be quickly and easily reconfigured without the need for an outside programming device.

Each of the light screens 102 described above may be configured to operate as a master device, an intermediate device, or as a terminal device. Such flexibility of configuration may allow fewer variations of devices to be manufactured, or warehoused, and provides maximum flexibility for customers to configure and reconfigure as their needs change. Changes to configuration may be achieved through hardware switches, or software switches triggered by user action, or by circuits within light screen 102 which automatically query and sense their location in the system, or some combination of these approaches. Alternatively, it may be desirable or advantageous to have unique units for each application, master, intermediate or terminal.

The above specification, examples and data provide a complete description of the manufacture and use of the composition of the invention. It is understood that many embodiments of the invention can be made without departing from the spirit and scope of the invention, and that many variations of the teachings provided herein can be made. For example, the master light screen may be configured to detect and operate in the situation where it is also the terminal light screen thus comprising a standalone light curtain system. It is further understood that the invention resides in the claims hereinafter appended.

What is claimed is:

1. A light screen safety system comprising:
a plurality of light screens including a master light screen and at least one other light screen, the at least one other light screen operably connected and arranged sequentially upstream from the master light screen, each light screen including at least one processor, an emitter with a plurality of light transmitters, and a receiver with a plurality of light detectors, each light transmitter paired with one light detector;
a control unit operably connected to and downstream from the master light screen;
the processor of each light screen configured to determine if a light signal transmitted by any of the light transmitters is blocked from being received by the paired detector;
the processor of the at least one other light screen configured to send a stop signal to the master light screen when a blocked condition is detected; and
the processor of the master light screen transmitting the stop signal to the control unit when the master light screen receives the stop signal from an adjacent upstream light screen.

2. The light screen safety system of claim 1, wherein the processor of each light screen sequentially queries each light detector of the light screen to determine if a blocked condition exists, and the sequence of querying of each light screen is independent of the query sequence of any other light screens.

3. The light screen safety system of claim 2, wherein the processor of each light screen queries the light detectors of that light screen substantially simultaneously with the processor of another of the light screens querying of the light detectors of the other light screen.

4. The light screen safety system of claim 1, further comprising a cable electrically connecting the control unit to the master light screen and a cable electrically connecting each light screen to adjacent upstream and/or downstream light screens.

5. The light screen safety system of claim 4, where the light screen positioned upstream of the other light screens is the terminal light screen and any signals communicated upstream from other light screens via the cables are terminated by the terminal light screen.

6. The light screen safety system of claim 1, wherein the processor of a light screen which receives the stop signal generated by an upstream light screen will immediately send the stop signal to a next adjacent downstream light screen.

7. The light screen safety system of claim 1, wherein each of the light screens comprises two processors.

8. The light screen safety system of claim 1, wherein the circuitry of each light screen includes memory to retain information relating to a position of the light screen within the system.

9. The light screen safety system of claim 8, wherein the memory of each light screen also retains information relating to quantities of light screens positioned upstream of the light screen.

10. The light screen safety system of claim 1, wherein the light screen positioned upstream from the other light screens is the terminal light screen, and the system further comprises a safety device positioned upstream of the terminal light screen and electrically connected to the terminal light screen, the safety device configured to transmit a stop signal to the terminal light screen and the terminal light screen configured to transmit this stop signal to the next downstream light screen.

11. The light screen safety system of claim 1, wherein the processor of the master light screen is identically configured to the processor of the at least one other light screen.

12. The light screen safety system of claim 11, wherein the light screens have the same number of paired light transmitters and light detectors.

13. A method of programming a light screen safety system, the light screen safety system comprising a master light screen electrically connected to a control unit and at least a first upstream light screen, each light screen including a plurality of light transmitters, a plurality of light detectors, and on-board circuitry including a microprocessor and memory, the method comprising:
  placing the master light screen of the light screen safety system into a configuration mode, the master light screen signaling any upstream light screens to initiate configuration by sending a polling signal to the first upstream light screen;
  after each upstream screen receives the polling signal, initiating a configuration mode of the upstream light screen, and resending the polling signal upstream until all upstream light screens have been signaled to initiate configuration mode;
  sending a query signal from the master light screen to the first upstream light screen;
  after the on-board circuitry of the first upstream light screen receives the query signal, sending a response signal downstream to the master light screen, and retransmitting the query signal to any next upstream light screen;
  after the on-board circuitry of each light screen receives the query signal and sends a response signal downstream, and any intermediate light screens retransmit the response signal received from any upstream light screens downstream to any next downstream light screen, the on-board circuitry of the master screen determining the configuration of the light screen safety system from the received response signals and storing the configuration information of the light screen safety system in the on-board circuitry of the master light screen.

14. The method of claim 13, wherein the on-board circuitry of the master light screen retains the configuration information of the light screen safety system in persistent memory and repolls each of the upstream light screens of the light screen safety system whenever an operational status of the light screen safety system changes.

15. The method of claim 13, wherein the on-board circuitry of each upstream light screen retains information relating to any other upstream light screens in memory.

16. A method of using a light screen safety system comprising:
  providing a light screen safety system comprising:
    (a) a plurality of light screens including a master light screen and at least one other light screen, the at least one other light screen operably connected and arranged sequentially upstream from the master light screen, each light screen including at least one processor, an emitter with a plurality of light transmitters, and a receiver with a plurality of light detectors, each light transmitter paired with one light detector; and
    (b) a control unit operably connected to and downstream from the master light screen;
  determining at each light screen whether a light signal transmitted by any of the light transmitters of the screen is blocked from being received by the paired detector;
  sending a stop signal from the at least one other light screen to the master light screen when a blocked condition is detected; and
  transmitting the stop signal to the control unit when the master light screen receives the stop signal from an adjacent upstream light screen.

17. The method of claim 16, wherein providing the light screen safety system comprising providing the light screen safety system comprising at least two other light screens arranged upstream from the master light screen.

18. The method of claim 16, further comprising:
  separating the at least one light screen from the master light screen; and
  operating the master light screen as a single cascade unit.

19. A light screen safety system comprising:
  a plurality of units operably connected and arranged sequentially with respect to each other from a first unit to a last unit, each of the units comprising at least one processor, the plurality of units including a plurality of light screens and at least one control unit, each light screen comprising an emitter with a plurality of light transmitters, and a receiver with a plurality of light detectors, each of the light transmitters being paired with one of the light detectors;
  the processor of each light screen being configured to determine whether a light signal transmitted by any of the light transmitters of the light screen is blocked from being received by the paired detector;
  each light screen being configured to send a stop signal to a next adjacent downstream one of the units when a blocked condition is detected by the light screen;

the processor of each unit being configured to transmit a stop signal to a next adjacent downstream one of the units if the processor receives the stop signal from a next adjacent upstream one of to units until the last unit receives the stop signal; and the plurality of light screens including a master light screens the processor of the master light screen being configured to transmit a stop signal to the control unit when the master light screen receives a stop signal from an adjacent upstream unit.

20. The light screen safety system of claim 1 wherein the plurality of light screens includes at least two other light screens; and wherein the processor of each the at least two other light screens is configured to transmit the stop signal to a next adjacent downstream one of the light screens if the processor receives the stop signal from a next adjacent upstream one of the light screens.

21. The light screen safety system of claim 1 wherein the processor of the master light screen is configured to generate and transmit a stop signal to the control unit when the light signal is blocked from being received by the paired detector of the master light screen.

22. The light screen safety system of claim 5, further comprising an emergency shut off switch connected to the terminal light screen.

23. The method of claim 17 further comprising transmitting to stop signal to a next adjacent downstream one of the light screens if the stop signal is received from a next adjacent upstream one of the light screens.

24. The method of claim 16 wherein the processor of the master light screen is configured to generate and transmit a stop signal to the control unit when the light signal is blocked from being received by the paired detector of the master light screen.

* * * * *

UNITED STATES PATENT AND TRADEMARK OFFICE
CERTIFICATE OF CORRECTION

PATENT NO.        : 7,329,854 B2                                              Page 1 of 1
APPLICATION NO. : 11/236003
DATED             : February 12, 2008
INVENTOR(S)       : Frank L. Clifton, Dean C. Erickson and Gregory B. Ingersoll It is certified that error appears in the above-identified patent and that said Letters Patent is hereby corrected as shown below:

Column 10, Line 34, "the screen" should read -- the light screen --

Column 12, Line 9, "to stop signal" should read -- the stop signal --

Signed and Sealed this

Eighteenth Day of November, 2008

JON W. DUDAS
*Director of the United States Patent and Trademark Office*